(12) United States Patent
Tsunematsu

(10) Patent No.: US 8,553,985 B2
(45) Date of Patent: Oct. 8, 2013

(54) IMAGE PROCESSING APPARATUS, IMAGE PROCESSING METHOD AND COMPUTER-READABLE MEDIUM

(75) Inventor: Yuuichi Tsunematsu, Kowloon (HK)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 13/189,417

(22) Filed: Jul. 22, 2011

(65) Prior Publication Data

US 2012/0051653 A1   Mar. 1, 2012

(30) Foreign Application Priority Data

Aug. 27, 2010   (JP) ................................. 2010-191391

(51) Int. Cl.
   *G06K 9/48*   (2006.01)

(52) U.S. Cl.
   USPC .......................................................... 382/199

(58) Field of Classification Search
   USPC .......................................................... 382/199
   See application file for complete search history.

(56) References Cited

U.S. PATENT DOCUMENTS

| 5,666,439 | A | * | 9/1997 | Ishida et al. | 382/190 |
|---|---|---|---|---|---|
| 6,404,921 | B1 | | 6/2002 | Ishida | 382/197 |
| 6,683,967 | B1 | * | 1/2004 | Takahashi | 382/101 |
| 6,798,895 | B1 | * | 9/2004 | Takahashi | 382/101 |
| 7,889,938 | B2 | * | 2/2011 | Ishida | 382/242 |
| 2005/0238244 | A1 | | 10/2005 | Uzawa | 382/242 |
| 2007/0025617 | A1 | | 2/2007 | Dai et al. | 382/180 |
| 2007/0230809 | A1 | | 10/2007 | Ishida | 382/242 |
| 2010/0231995 | A1 | | 9/2010 | Tsunematsu | 358/530 |
| 2011/0128586 | A1 | | 6/2011 | Tsunematsu | 358/2.1 |

FOREIGN PATENT DOCUMENTS

| JP | 3026592 | 3/2000 |
|---|---|---|
| JP | 2006-31245 | 2/2006 |
| JP | 2006-344069 | 12/2006 |
| JP | 2007-293829 | 11/2007 |
| JP | 4378208 | 12/2009 |

OTHER PUBLICATIONS (Alexei N. Skourikhine, "Dialted Contour Extraction and Component Labeling algorithm for object vector Representation", 2013, proc. of SPIE vol. 5916 5916W-1).*
Toriwaki, "Digital Image Processing for Image Understanding, vol. 2", First Edition, Third Printing, ISBN 4-7856-2004-8 (English Translation of pp. 66 to 79 of Japanese version).
Toriwaki, "Digital Image Processing for Image Understanding, vol. 2", First Edition, Third Printing, ISBN 4-7856-2004-8.

* cited by examiner

*Primary Examiner* — Samir Ahmed
*Assistant Examiner* — Totam Le
(74) *Attorney, Agent, or Firm* — Fitzpatrick, Cella, Harper & Scinto

(57) ABSTRACT

An image processing apparatus which performs boundary line extraction for raster image data, comprises: a detection unit configured to detect a color region formed from a plurality of pixels having an 8-neighbor connection in the image data; a determination unit configured to determine whether the 8-neighbor connection in the color region detected by the detection unit is to be modified to a 4-neighbor connection, in accordance with a connection state of pixels connected by the 8-neighbor connection and pixels surrounding the pixels connected by the 8-neighbor connection; a modification unit configured to modify the 8-neighbor connection in the color region, a modification of which is determined by the determination unit, by converting a pixel value of a pixel neighboring the pixels connected by the 8-neighbor connection; and an extraction unit configured to extract a boundary line from image data modified by the modification unit.

9 Claims, 12 Drawing Sheets

BEFORE FUNCTION APPROXIMATION

AFTER FUNCTION APPROXIMATION

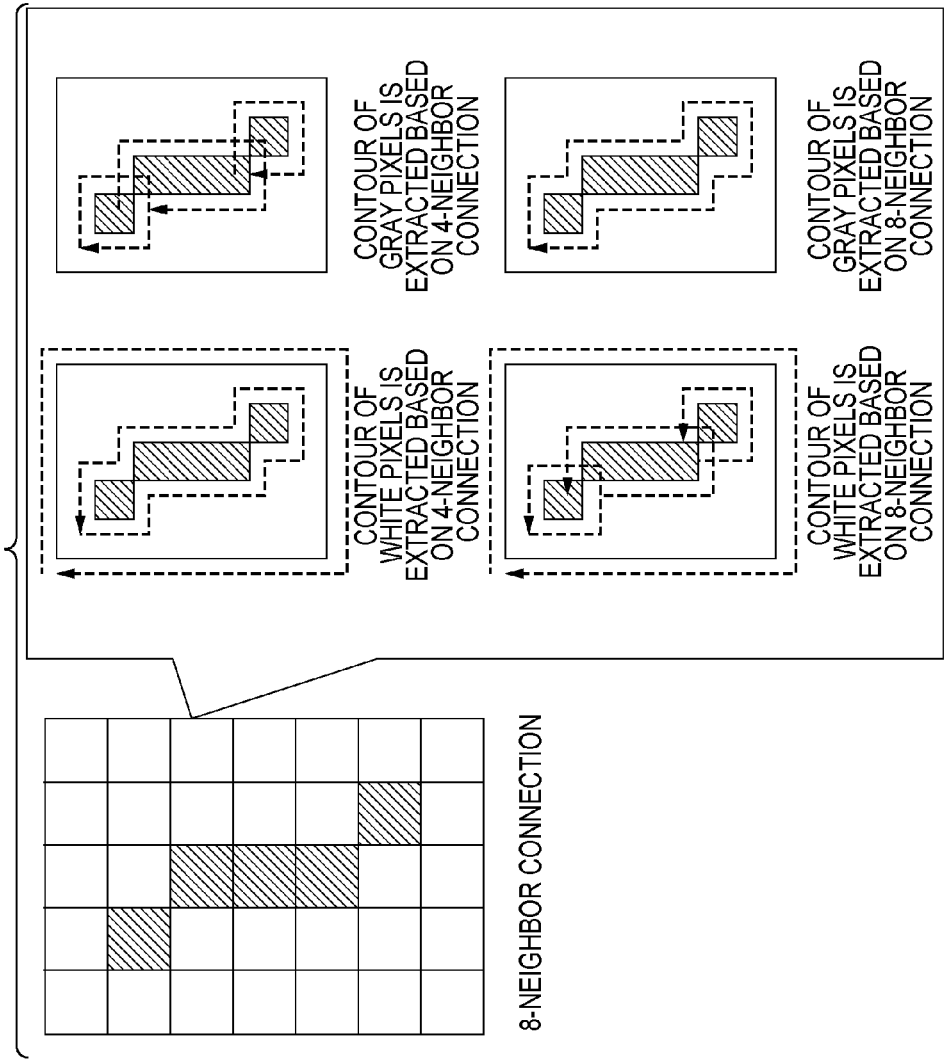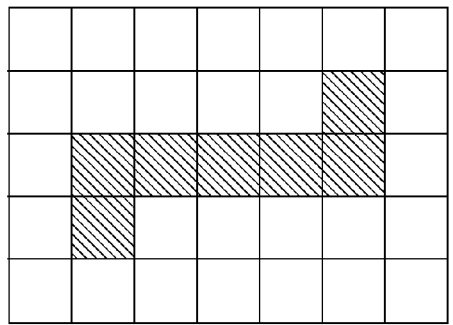

F I G. 5
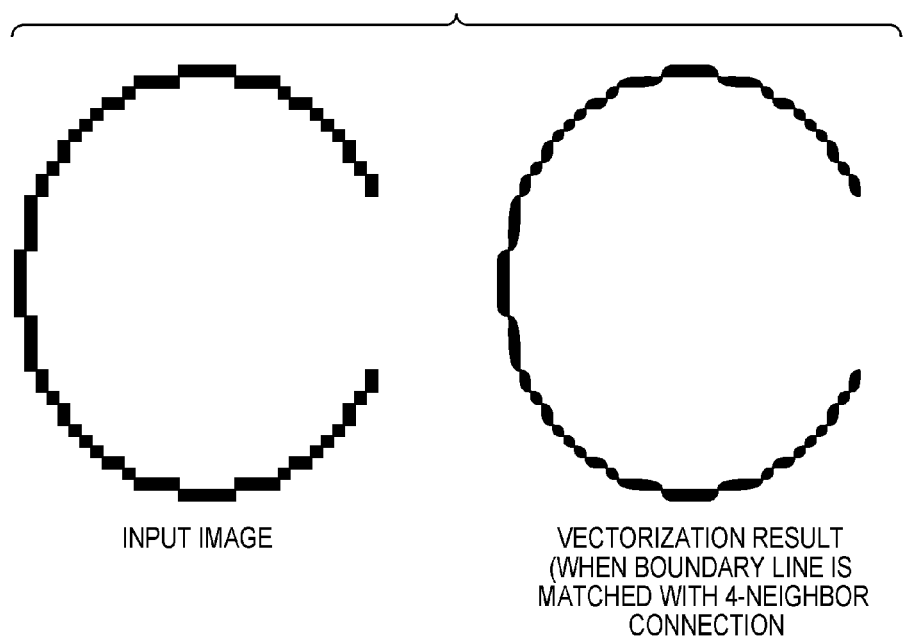
INPUT IMAGE
VECTORIZATION RESULT
(WHEN BOUNDARY LINE IS
MATCHED WITH 4-NEIGHBOR
CONNECTION

FIG. 11

| LINE NUMBER | ENDPOINT COORDINATE POSITIONS (START POINT AND END POINT) | | DIRECTION DEFINED FROM START POINT | COORDINATE POINT ARRAY |
|---|---|---|---|---|
| 1 | (1, 1) | (1, 1) | RIGHTWARD | (1, 1), (6, 1), (6, 5), (3, 5), (3, 4), (1, 4), (1, 1) |
| 2 | (4, 3) | (4, 3) | LEFTWARD | (4, 3), (2, 3), (2, 2), (4, 2), (4, 3) |
| 3 | (4, 3) | (4, 3) | RIGHTWARD | (4, 3), (5, 3), (5, 4), (4, 4), (4, 3) |
| 4 | (4, 8) | (5, 7) | LEFTWARD | (4, 8), (2, 8), (2, 7), (3, 7), (3, 6), (5, 6), (5, 7) |
| 5 | (4, 8) | (5, 7) | UPWARD | (4, 8), (4, 7), (5, 7) |
| 6 | (4, 8) | (5, 7) | RIGHTWARD | (4, 8), (6, 8), (6, 7), (5, 7) |

FIG. 12

| REGION NUMBER | LINE NUMBER |
|---|---|
| 1 | LINE 1, LINE 2, LINE 3 |
| 2 | LINE 2, LINE 3 |
| 3 | LINE 4, LINE 5(REVERSE SEQUENCE) |
| 4 | LINE 6 (REVERSE SEQUENCE), LINE 5 |

FIG. 13

| LINE NUMBER | COORDINATE POINT ARRAY | APPROXIMATION RESULT |
|---|---|---|
| 1 | (1, 1), (6, 1), (6, 5), (3, 4), (1, 4), (1, 1) | L(1, 1), L(6, 1), L(6, 5), C(3, 5), C(3, 4), L(1, 4), Z |
| 2 | (4, 3), (2, 3), (2, 2), (4, 2), (4, 3) | L(4, 3), L(2, 3), L(2, 2), L(4, 2), L(4, 3) |
| 3 | (4, 3), (5, 3), (5, 4), (4, 4), (4, 3) | L(4, 3), L(5, 3), L(5, 4), L(4, 4), L(4, 3) |
| 4 | (4, 8), (2, 8), (2, 7), (3, 7), (3, 6), (5, 6), (5, 7) | L(4, 8), L(2, 8), C(2, 7), C(3, 7), L(3, 6), L(5, 6), L(5, 7) |
| 5 | (4, 8), (4, 7), (5, 7) | L(4, 8), L(4, 7), L(5, 7) |
| 6 | (4, 8), (6, 8), (6, 7), (5, 7) | L(4, 8), L(6, 8), L(6, 7), L(5, 7) |

IMAGE PROCESSING APPARATUS, IMAGE PROCESSING METHOD AND COMPUTER-READABLE MEDIUM

BACKGROUND OF THE INVENTION

1. Field of the Invention

The present invention relates to an image processing apparatus, an image processing method, and a computer-readable medium which vectorize a color image. The present invention more particularly relates to a technique of extracting a boundary line common to color regions from a contour coordinate point array when a color region (a region formed from pixels that can be regarded as having the same color) includes an 8-neighbor connection.

2. Description of the Related Art

A method of extracting contour information (Japanese Patent No. 3026592) and a method of approximating a coordinate point array by a given function (Japanese Patent No. 4378208) have been proposed as techniques associated with image vectorization which assumes a text as a target. Further, vectorization for a line image (Japanese Patent Laid-Open No. 2007-293829) and vectorization for a color image (Japanese Patent Laid-Open No. 2006-344069), for example, have been proposed as techniques of vectorization processing for various types of images assuming general illustration images as targets.

Vectorized data allows smooth contour representation free from jaggies even when it is scaled to a desired size. Also, vectorized data has an effect of reducing the data size in, for example, an illustration image, thus offering an advantage in facilitating, for example, editing processing on a computer. An image such as a text or a line image can often be processed as a binary or monochrome image, so a preferable vectorization result can be obtained for this image when a contour extracted for each color connection region (each set of pixels having the same color) is approximated by a given function. However, an illustration often has a multiple of colors, so a method of processing the boundary line between neighboring color regions must be devised in that case. When, for example, processing compatible with a binary image is directly applied to a multilevel image, a contour (boundary line) is extracted for each color region, and the contour (boundary line) is approximated by a given function for each of the extracted color regions. Unfortunately, when the boundary line between neighboring color regions is approximated by a given function individually for each color region, two different approximation curves are obtained for one boundary line due to an approximation error, thus generating a gap or an overlap between them. FIGS. 3A and 3B show this problem. FIG. 3A illustrates an example in which the contour shapes of color regions are extracted from an input image. Three neighboring color regions (having boundary lines shared with other regions) are present, assuming that the white background is excluded. FIG. 3B shows the result of processing of approximating contour information shown in FIG. 3A by a given function individually for each color region, in which a gap and/or an overlap is generated between color regions.

In view of the above-mentioned problem, a vectorization method which generates no gap between color regions has also been proposed. In, for example, Japanese Patent Laid-Open No. 2006-031245, the boundary between pixels having a color difference equal to or larger than a predetermined threshold is traced as a contour, and the tracing path is branched every time it reaches an intersection point of color regions, thereby repeatedly searching for the contour. A partial contour segmented between intersection points of color regions is approximated by a given function upon defining it as the unit of processing of function approximation, and data after function approximation are concatenated together, thereby generating vector data. Therefore, an approximation result common to boundary lines is applied, so neither a gap nor an overlap is generated between them in principle.

In general, two concepts are available for the pixel connection state. The first concept is a 4-neighbor connection (4-connectivity), in which when pixels in four directions: the upward, downward, leftward, and rightward directions upon defining a pixel of interest as their center are searched, and a pixel having the same color as the pixel of interest is detected, the detected pixel and the pixel of interest are regarded as being connected to each other. The second concept is an 8-neighbor connection (8-connectivity), in which when pixels in eight directions: the upward, downward, leftward, rightward, and oblique directions upon defining a pixel of interest as their center are searched, and a pixel having the same color as the pixel of interest is detected, the detected pixel and the pixel of interest are regarded as being connected to each other. Contours can be classified into a contour (to be referred to as an outside contour hereinafter) which forms the external boundary between regions, and a contour (to be referred to as an inside contour hereinafter) which forms the internal boundary between these regions. Note that when an image includes a pixel set having an 8-neighbor connection, which includes a portion in which neighboring pixels are connected only in an oblique direction, the following problem is posed when the contour of a region having the pixel set is extracted. An outside contour extracted upon defining the pixel set as that having an 8-neighbor connection becomes one outside contour, including the portion in which neighboring pixels are connected only in an oblique direction. On the other hand, an inside contour extracted upon defining another pixel set neighboring the outside of the pixel set as that having an 8-neighbor connection becomes a set of two inside contours as it is cut in the portion in which neighboring pixels are connected only in an oblique direction. That is, an outside contour extracted based on a first pixel set which includes a portion in which neighboring pixels are connected only in an oblique direction, and an inside contour extracted based on a second pixel set which surrounds the first pixel set, have different shapes. This makes it difficult to identify a boundary line common to pixel sets.

FIGS. 4A and 4B show the difference in contour extraction result due to factors associated with the connection characteristics between a 4-neighbor connection and an 8-neighbor connection. Seven gray pixels (hatched portions) are connected by a 4-neighbor connection in FIG. 4A, while five gray pixels are connected by an 8-neighbor connection in FIG. 4B. When a color contour shown in FIG. 4A is extracted, the inside contour of white pixels coincides with the outside contour of gray pixels regardless of whether the concept of a 4-neighbor connection or an 8-neighbor connection is adopted. However, in case of FIG. 4B, when the inside contour of white pixels and the outside contour of gray pixels are extracted based on the concept of a 4-neighbor connection, the inside contour of white pixels is extracted as one continuous coordinate point array (one inside contour), while the outside contour of gray pixels is extracted as three coordinate point arrays (three outside contours) because it is determined that this outside contour is not continuous in a portion in which neighboring pixels are connected only in an oblique direction. Also, when the inside contour of white pixels and the outside contour of gray pixels are extracted based on the concept of an 8-neighbor connection, the outside contour of gray pixels is extracted as one coordinate point array (one outside contour), while the inside contour of white pixels is extracted as three coordinate point arrays (three inside contours) because it is determined that this inside contour is continuous in a portion neighboring only in an oblique direction. In this case, when a common boundary line is to be extracted, the differences in number of loops which form a contour and in number of coordinate points included in each loop pose a problem, thus making it very difficult to identify a common boundary line. Japanese Patent No. 3026592 discloses no method of solving this problem.

To combat this situation, each of a coordinate point array extracted as an outside contour and that extracted as an inside contour can be cut in a portion in which neighboring pixels are connected only in an oblique direction, and compare the cut coordinate point arrays as boundary lines. However, when a fine line having an 8-neighbor connection is input as an input image as shown in FIG. 5, the boundary line is finely cut in a portion in which neighboring pixels are connected in an oblique direction. Then, when each cut contour is individually approximated by a given function and vectorized, the image quality of vector data output as a vectorization result considerably degrades.

SUMMARY OF THE INVENTION

Even if an input image includes a pattern including an 8-neighbor connection, it is possible to extract a boundary line suitable for vectorization processing, thus improving the image quality of the vectorization result.

According to one aspect of the present invention, there is provided an image processing apparatus which performs boundary line extraction for raster image data, comprising: a detection unit configured to detect a color region formed from a plurality of pixels having an 8-neighbor connection in the image data; a determination unit configured to determine whether the 8-neighbor connection in the color region detected by the detection unit is to be modified to a 4-neighbor connection, in accordance with a connection state of pixels connected by the 8-neighbor connection and pixels surrounding the pixels connected by the 8-neighbor connection; a modification unit configured to modify the 8-neighbor connection in the color region, a modification of which is determined by the determination unit, by converting a pixel value of a pixel neighboring the pixels connected by the 8-neighbor connection; and an extraction unit configured to extract a boundary line from image data modified by the modification unit.

According to another aspect of the present invention, there is provided an image processing method of performing boundary line extraction for raster image data, comprising: a detection step of detecting a color region formed from a plurality of pixels having an 8-neighbor connection in the image data; a determination step of determining whether the 8-neighbor connection in the color region detected in the detection step is to be modified to a 4-neighbor connection, in accordance with a connection state of pixels connected by the 8-neighbor connection and pixels surrounding the pixels connected by the 8-neighbor connection; a modification step of modifying the 8-neighbor connection in the color region, a modification of which is determined in the determination step, by converting a pixel value of a pixel neighboring the pixels connected by the 8-neighbor connection; and an extraction step of extracting a boundary line from image data modified in the modification step.

Further features of the present invention will become apparent from the following description of exemplary embodiments with reference to the attached drawings.

BRIEF DESCRIPTION OF THE DRAWINGS

FIGS. 4A and 4B are views for explaining the difference in extracted contour due to the difference in connection characteristic;

FIG. 5 is a view showing a vectorization result generated by extracting a contour based on a 4-neighbor connection, and approximating a boundary line by a given function;

FIG. 11 is a table for explaining information associated with the extracted boundary lines;

FIG. 12 is a table for explaining region rearrangement information;

FIG. 13 is a table showing the results of function approximation of the boundary lines shown in FIG. 11.

DESCRIPTION OF THE EMBODIMENTS

<First Embodiment>
[System Configuration]

Embodiments of the present invention will be described below with reference to the accompanying drawings. However, constituent elements described in these embodiments merely give examples, so the technical scope of the present invention is determined by the scope of claims and is not limited by the following individual embodiments.

Figure 2:
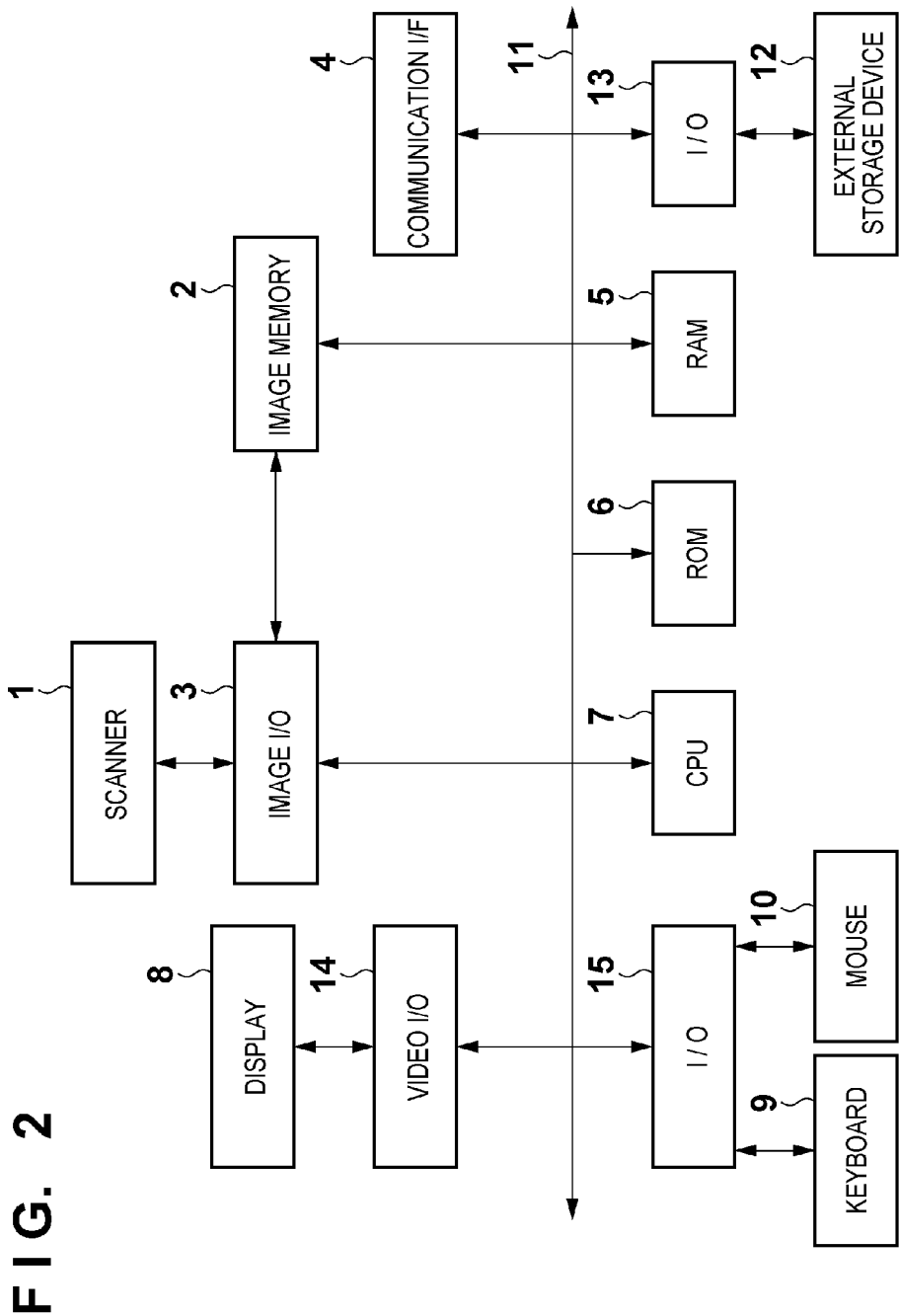
FIG. 2 is a block diagram of the information processing apparatus according to the first embodiment.
Figure 3A:
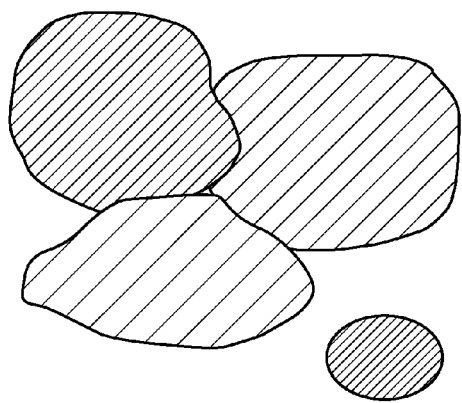
FIGS. 3A and 3B are views illustrating examples in which an overlap or a gap is generated between color regions upon function approximation.
Figure 3B:
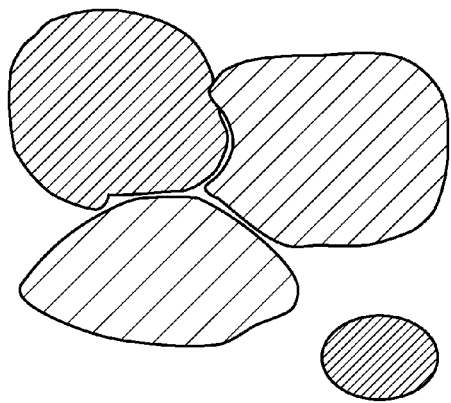

An example of the configuration of an image processing apparatus in this embodiment will be described with reference to a block diagram shown in FIG. 2. Referring to FIG. 2, a CPU (Central Processing Unit) 7 controls the entire apparatus. A ROM (Read Only Memory) 6 stores a program and parameter which require no changes. A RAM (Random Access Memory) 5 temporarily stores a program and data supplied from, for example, an external device. A scanner 1 is used to photoelectrically scan, for example, a document to obtain electronic image data, and an image input/output (I/O) 3 connects the scanner 1 and the image processing apparatus. An image memory 2 holds, for example, image data read by the scanner 1. Note that the image data read by the scanner 1 has a raster format formed from pixels arrayed in a grid pattern, and each pixel has a pixel value corresponding to a color represented by, for example, the RGB color model. Such image data is called dot image data or raster image data.

An external storage device 12 includes, for example, a hard disk and memory card fixed in position, a detachable flexible disk (FD), an optical disk such as a CD (Compact disk), a magnetic or optical card, an IC card, or a memory card.

An I/O 13 is an interface between the external storage device 12 exemplified by the above-mentioned members and the computer apparatus. An I/O 15 is an interface with input devices such as a keyboard 9 and a pointing device (for example, a mouse 10), which accept a user's operation and input data. A video I/O 14 is an interface with a display monitor 8 used to display supplied data or data held in the image processing apparatus. A communication I/F 4 is an interface used to connect the image processing apparatus to a network line such as the Internet. A system bus 11 communicably connects the above-mentioned units in the image processing apparatus to each other.

[Processing Sequence]

Figure 1:
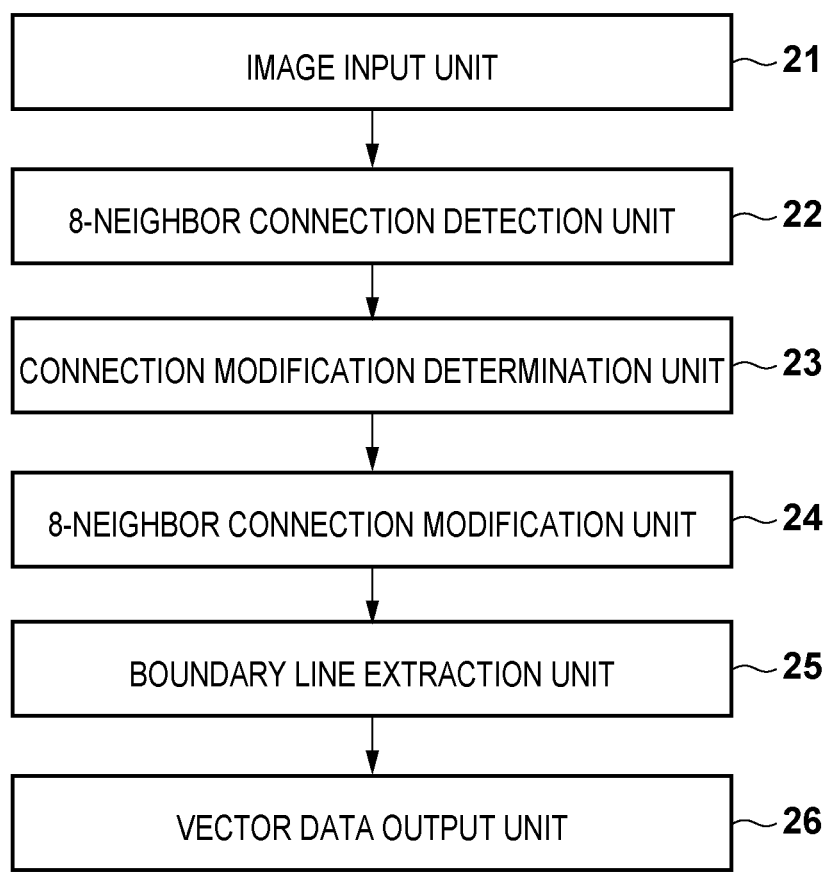
FIG. 1 is a block diagram of main processing of an information processing apparatus according to the first embodiment.
Figure 6:
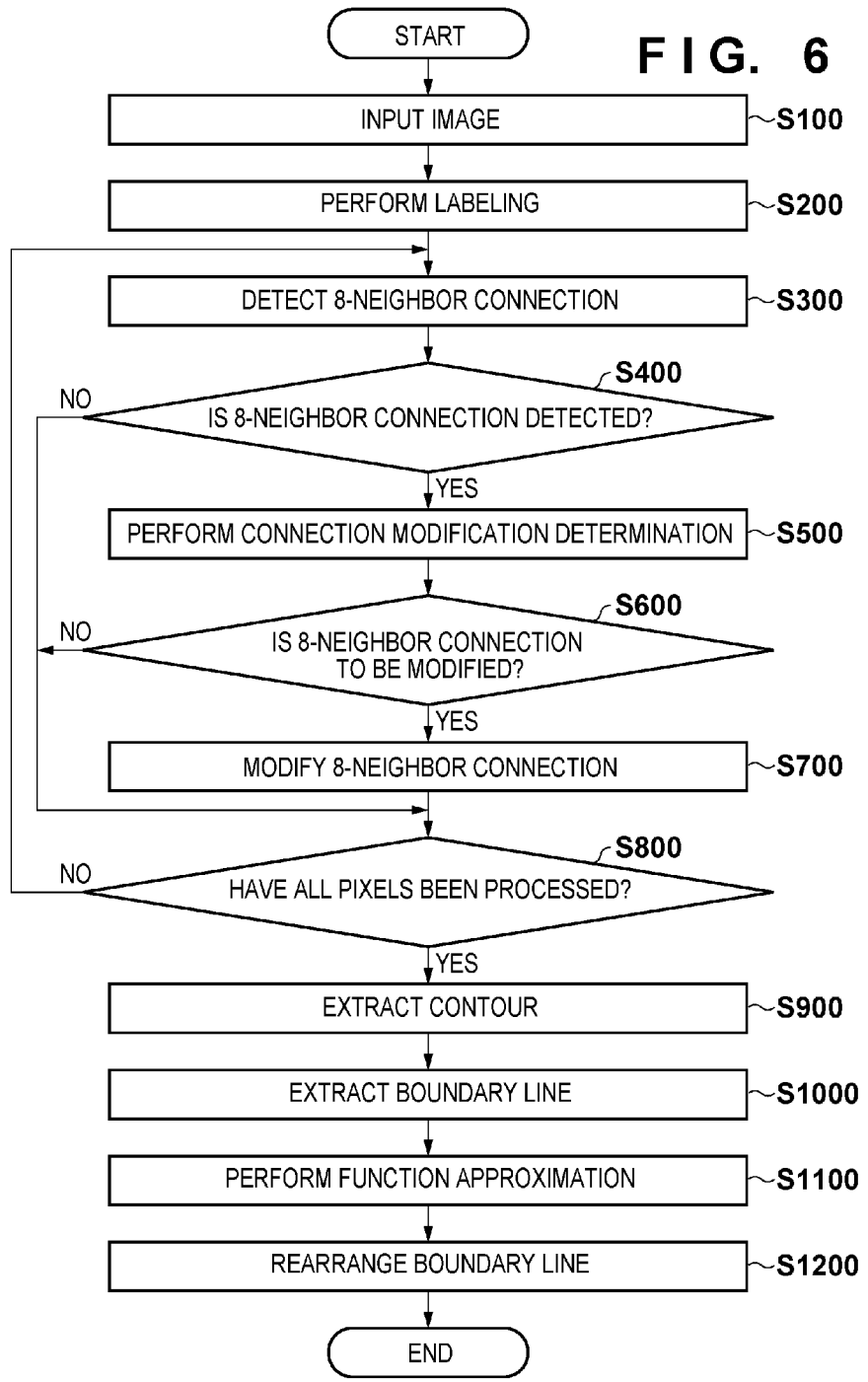
FIG. 6 is a flowchart showing the overall processing according to the first embodiment.

A processing procedure for implementing the present invention using a program which is read out from a storage unit such as the ROM 6 and executed on the CPU 7 will be described with reference to a block diagram shown in FIG. 1 and a flowchart shown in FIG. 6. When the process starts, the CPU 7 inputs image data including an image region to be processed in step S100. In inputting an image, image data read by the scanner 1 is input to the image memory 2 via the image I/O 3. Alternatively, an image including the image region to be processed may be input from outside the apparatus via the communication I/F 4, or image data stored in the external storage device 12 in advance may be read via the I/O 13. The obtained input image is held on the image memory 2.

Note that when an input unit such as a scanner is used, noise may be superimposed on an input image, thus making it difficult to specify a representative color. Hence, the CPU 7 may apply color region division processing for the input image in step S100. This makes it possible to eliminate noise generated upon, for example, inputting a scanned image. A technique (a technique of eliminating scan noise by forming clusters from pixels in an input image based on their color information, and integrating similar clusters and clusters expected to have noise) disclosed in Japanese Patent Laid-Open No. 2006-344069, for example, can be adopted.

In step S200, the CPU 7 performs labeling processing for the image data read in step S100. The labeling processing assigns the same number to a set of pixels which have the same value and are to be connected, and is often used as preprocessing for obtaining information (the area and shape) of each region. In this case, an identifier (region number) which allows identification of a color region in post-processing is assigned to each pixel in the image data. Then, the CPU 7 holds, in a storage area, data obtained by assigning an identifier to each pixel. Although the concepts of a 4-neighbor connection (4-connectivity) and 8-neighbor connection (8-connectivity) are available in labeling processing as well, labeling processing must be performed so as to form the same connection state as that formed in contour extraction processing to be performed later. The above-mentioned processing implements an image input unit 21 shown in FIG. 1.

In step S300, the CPU 7 performs detection processing of an 8-neighbor connection (a connection in an oblique direction) for the labeling processing result. In this case, a window including 3×3 pixels is shifted with raster scanning with respect to the labeling processing result, thereby confirming whether an 8-neighbor connection exists around a pixel (central pixel) which is at the central position of the window and serves as the pixel of interest. An 8-neighbor connection or 8-neighbor connections may exist in four directions: 1. the upper left, 2. the upper right, 3. the lower left, and 4. the lower right with respect to the pixel of interest. Therefore, the presence of an 8-neighbor connection is confirmed in the above-mentioned sequence. When, for example, the upper left pixel is checked (it is confirmed whether a pixel neighboring the upper side of the pixel of interest and that neighboring the left side of the pixel of interest have an 8-neighbor connection between them), this is done in accordance with three conditions:

1. the pixel neighboring the upper side of the pixel of interest and that neighboring the left side of the pixel of interest have the same region number, 2. the pixel of interest and the pixel neighboring its upper side have different region numbers, and 3. the pixel neighboring the upper side of the pixel of interest and that neighboring the upper left side of the pixel of interest have different region numbers.

The same applies to checking in the remaining directions, which is done based on individual pixels corresponding to different directions.

If an 8-neighbor connection which satisfies the above-mentioned conditions exists in one of the four directions (YES in step S400), the process advances to step S500. If no 8-neighbor connection is detected, the process advances to step S800. The above-mentioned processing implements an 8-neighbor connection detection unit 22 shown in FIG. 1.

In step S500, the CPU 7 performs connection modification determination. Although the CPU 7 detects an 8-neighbor connection in step S300, the feature of the input image pattern may deteriorate if all detected 8-neighbor connections are modified to 4-neighbor connections. Hence, the pixel of interest is modified to determine whether the feature of the image pattern changes considerably, in accordance with several predefined determination criteria.

A connection example of a possible 8-neighbor connection will be given with reference to FIG. 7. Note that filled circles indicate the pixels of interest. In a window 701, pixels neighboring the lower and left sides of the pixel of interest have an 8-neighbor connection between them (in this case, an 8-neighbor connection exists on the lower left side of the pixel of interest). In this case, even when the pixel of interest is modified to that which falls within the same region as the lower left region having the 8-neighbor connection, the feature of the input image does not deteriorate considerably. Therefore, the region number of the pixel of interest is substituted with that of the pixel which forms the 8-neighbor connection in subsequent processing, thereby modifying the 8-neighbor connection to a 4-neighbor connection. That is, modifying the pixel of interest makes it possible to extract the pixels neighboring its left and lower sides as those which fall within the same region even upon extraction based on a 4-neighbor connection.

In a window 702, pixels neighboring the right and upper sides of the pixel of interest have an 8-neighbor connection between them (pixels having an 8-neighbor connection exist on the upper right side of the pixel of interest). Although the 8-neighbor connection can be modified to a 4-neighbor connection by substituting the region number of the pixel of interest, the pixel of interest is an isolated point formed from only one pixel. An isolated point indicates herein a pixel having a pixel value (region number) different from those of all of eight neighboring pixels. If the region number of an isolated point is substituted with another region number, a color region disappears, so it is determined that substitution is impossible. Nevertheless, if an image with a relatively large size is input, and no problem occurs even when a region with an area of one pixel is processed as noise, this condition can be excluded.

In a window 703, pixels neighboring the pixel of interest in four directions: the upward, downward, leftward, and rightward directions have an 8-neighbor connection between them. However, if the region number of the pixel of interest is substituted with that of these neighboring pixels, this influences the connection relationships other than the 8-neighbor connection to be modified. When, for example, a checkerboard image pattern formed for each pixel is present, it may disappear upon substituting the region number of the pixel of interest with that of one of the neighboring pixels. Therefore, it is determined that substitution is impossible when a new connection occurs upon modifying an 8-neighbor connection detected in a certain direction to a 4-neighbor connection.

In a window 704, pixels neighboring the right and upper sides of the pixel of interest have an 8-neighbor connection between them (an 8-neighbor connection exists on the upper right side of the pixel of interest). However, when the value of the pixel of interest is substituted with that of these neighboring pixels to modify the detected 8-neighbor connection, an existing 8-neighbor connection (another 8-neighbor connection) including the pixel of interest is cut. Therefore, it is determined that a modification is impossible.

In a window 705, pixels neighboring the left and lower sides of the pixel of interest have an 8-neighbor connection between them (an 8-neighbor connection exists on the lower left side of the pixel of interest). However, the 8-neighbor connection in these pixels is not an 8-neighbor connection between fine lines. In this case, the 8-neighbor connection is preferably maintained intact to allow the original graphic feature to remain the same as much as possible, so the 8-neighbor connection is not modified. This determination can be done using confirmation windows 710 and 711, separately from the windows 701 to 705, each of which includes 3×3 pixels and is used in intersection point detection. When, for example, three pixels are defined as a predetermined threshold for the number of connected pixels, and a region with a dimension of three or more pixels is not regarded as a fine line, confirmation windows each including 3×3 pixels, as exemplified by the confirmation windows 710 and 711, are used. Then, it is confirmed whether all regions within a window including pixels which form the detected 8-neighbor connection have the same region number. If all pixels included in the confirmation window have the same region number, it is determined that the pixel of interest is an 8-neighbor connection point between regions having a dimension in the vertical or horizontal direction, which is equal to or larger than the threshold.

The foregoing description will be summarized as follows. As the first condition, no new 4-neighbor connection occurs in substitution for an 8-neighbor connection other than that of interest even when the pixel value of the pixel of interest is modified. As the second condition, no existing connection (existing 8-neighbor connection) is cut even when the pixel value of the pixel of interest is modified. As the third condition, the pixel of interest in the window is not an isolated point. If the above-mentioned three conditions are satisfied, it is determined that the pixel of interest is to be modified. Whether the pixel of interest in each layout shown in FIG. 7 can be modified is determined as:

the pixel of interest can be modified: the window 701
the pixel of interest cannot be modified: the windows 702 to 705

If a modification is to be performed (YES in step S600), the process advances to step S700; or if it is determined that a modification is impossible (NO in step S600), the process advances to step S800. The above-mentioned processing implements a connection modification determination unit 23 shown in FIG. 1.

If it is determined in step S500 that an 8-neighbor can be modified, the CPU 7 modifies the pixel of interest so that the 8-neighbor connection changes to a 4-neighbor connection in step S700. That is, by substituting the region number of the pixel of interest with that of the pixel which forms the detected 8-neighbor connection, the detected 8-neighbor connection can be modified to a 4-neighbor connection.

In step S800, the CPU 7 confirms whether all pixels have been checked. If a pixel to be checked remains, the window including 3×3 pixels moves to the next pixel of interest, and the process returns to step S300 and continues. The above-mentioned processing implements an 8-neighbor connection modification unit 24 shown in FIG. 1.

When 8-neighbor connection detection processing is complete for all pixels, the CPU 7 extracts the contour of a color region in the image data in step S900. The number of a color region having a contour to be extracted is selected, and the contour of the selected color region is extracted. At this time, the contour extraction method disclosed in Japanese Patent No. 3026592 can be adopted. The contour is extracted as a binary image formed from the selected color represented by 1 (graphic pixel) and the remaining region represented by 0 (background pixel). Although white pixels are assumed as the background pixels in this embodiment, other colors may be assumed as the background colors in contour extraction. In the latter case, it is also possible to extract the contour of pixels having a white color value.

The input image starts to undergo raster scanning from the upper left to generate and hold a horizontal/vertical table. After that, contour information is formed based on the horizontal/vertical table. Note that contour extraction processing is performed for each region divided based on the connection state in advance, so the obtained contour includes one outside contour, and zero or one or more inside contours. This facilitates determination of the tracing direction in the course of contour extraction. Although an example in which contour extraction is performed using raster scanning has been given herein, one outside contour is always determined even when the contour is traced. Therefore, as long as an outside contour is extracted with higher priority, contours to be extracted subsequently can be regarded as inside contours. By repeatedly executing the above-mentioned processing until no number of a color region to be extracted remains, contour information can be extracted for all color regions.

Note that in step S900, contour extraction processing of the contour tracing type may be performed in place of that of the raster scanning type. A method of tracing the pixel contour is commonly used in contour extraction. Toriwaki, "Digital Image Processing for Image Understanding, Vol. 2", First Edition, Third Printing, ISBN 4-7856-2004-8, Shokodo, Apr. 20, 1993, pp. 66-79, discloses a contour extraction method of the tracing type. Although a pixel tracing type used to trace a pixel, a side tracing type used to trace a side, and a vertex tracing type used to trace a vertex are introduced as tracing methods in this literature, the same processing result as that obtained in Japanese Patent No. 3026592 can be obtained upon performing contour extraction of the vertex tracing type. An outside contour and an inside contour can be discriminated by searching for the start point of tracing by raster scanning. An outside contour is located outside an inside contour by definition, so an outside contour is always detected first in raster scanning. Also, only one outside contour is always guaranteed based on the identification result obtained by labeling processing. Hence, the contour line detected first can be regarded as an outside contour, and contours detected subsequently can be regarded as inside contours.

Figure 8:
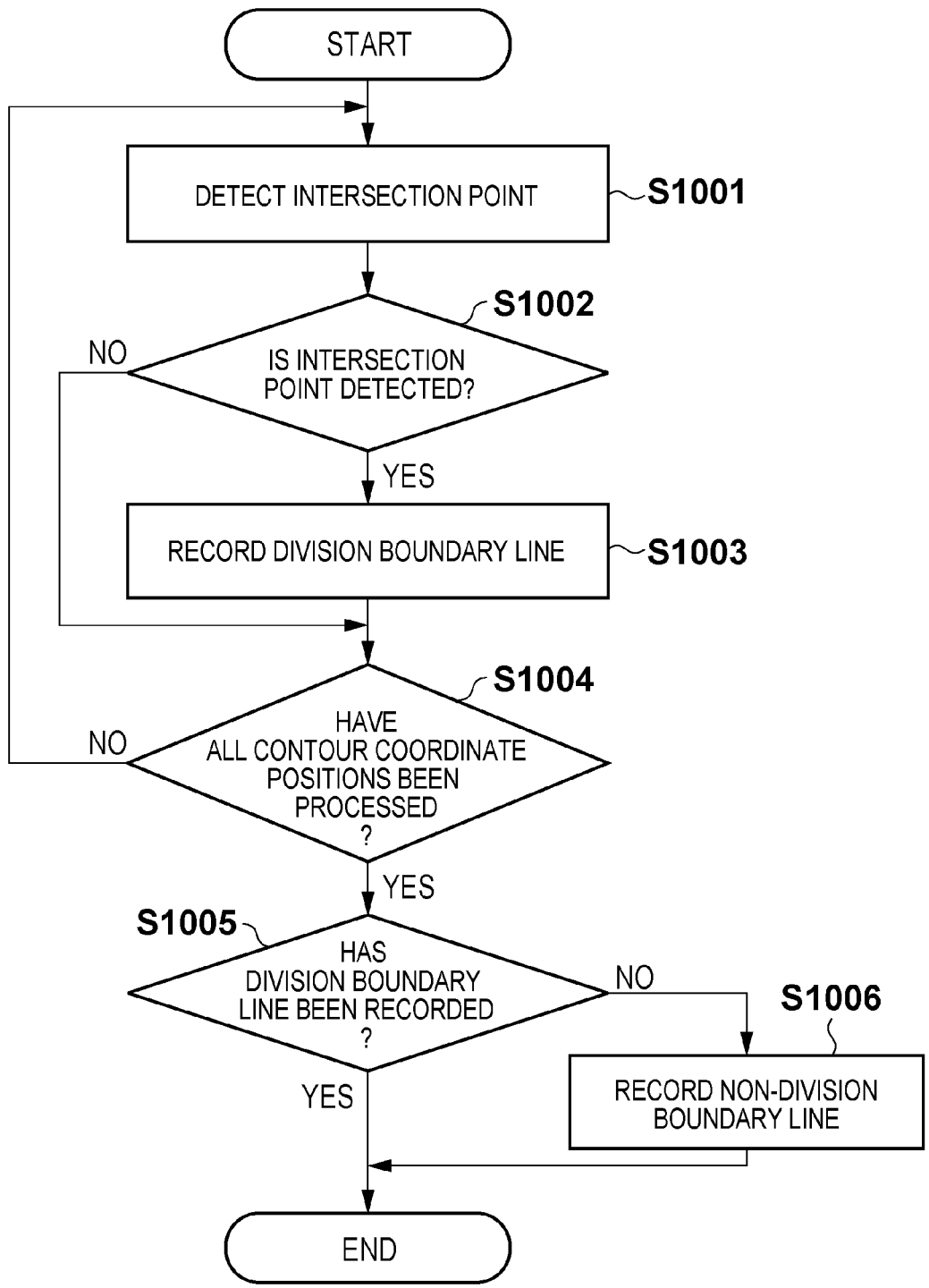
FIG. 8 is a flowchart of boundary line extraction processing according to the first embodiment.

In step S1000, the CPU 7 extracts the boundary line between color regions based on the contour coordinate position extracted in step S900. A detailed sequence of step S1000 will be described with reference to FIG. 8. In boundary line extraction processing, the labeling processing result obtained at a position corresponding to a contour coordinate position is referred to in order to detect an intersection point.

First, in step S1001, the CPU 7 detects an intersection point from image data using a window having a size of 2×2 pixels. A method of detecting an intersection point will be described with reference to FIG. 9. It is determined that an intersection point is detected in one of two cases: when a window including 2×2 pixels has three or more different color regions, as exemplified in a window 901 shown in FIG. 9; and when the window has identical color regions in oblique directions (the upper right and lower left pixels, and the upper left and lower right pixels), as exemplified in a window 902 shown in FIG. 9. It is determined that an intersection point of color regions is detected even in the latter case because the connection characteristics vary between the outside contour and inside contour of the color regions due to the influence of an 8-neighbor connection. In this case, it is difficult to identify a boundary line required in subsequent processing, so a portion having the 8-neighbor connection is regarded as being cut, and 4-neighbor connections are applied to both the cut portions, thereby facilitating boundary line identification processing. When this is not done, a comparison operation with an extracted boundary line which combines a plurality of coordinate point arrays is necessary.

If an intersection point is detected in step S1001 (YES in step S1002), the CPU 7 records a division boundary line in step S1003. A division boundary line indicates herein information which is formed from a contour coordinate point array and is present between the first intersection point and the second intersection point. Therefore, even if an intersection point is detected in step S1001, nothing is done as long as this intersection point is the first intersection point detected from the contour of a certain color region. FIG. 11 shows information recorded as a division boundary line by taking an image shown in FIG. 10 as an example. A line number used to uniquely identify a boundary line, contour coordinate positions including a start point/end point, a direction defined from the start point to the next point (four directions: the upward, downward, leftward, and rightward directions), and coordinate point array information between the endpoints, are held for each boundary line. When a boundary line is extracted based on contours extracted from all color regions, it is extracted twice. This is because a boundary line is in contact with two color regions.

For boundary lines represented by the same coordinate point array, the same information must be referred to when the function approximation results are concatenated in subsequent processing. Hence, to efficiently confirm whether the currently detected boundary line has already been extracted, the upper left corner of the image is defined as its origin, a boundary line is selected such that a point closer to the upper left corner than the origin becomes a start point, and this boundary line is recorded in association with connection information from the start point to the next point.

Figure 10:
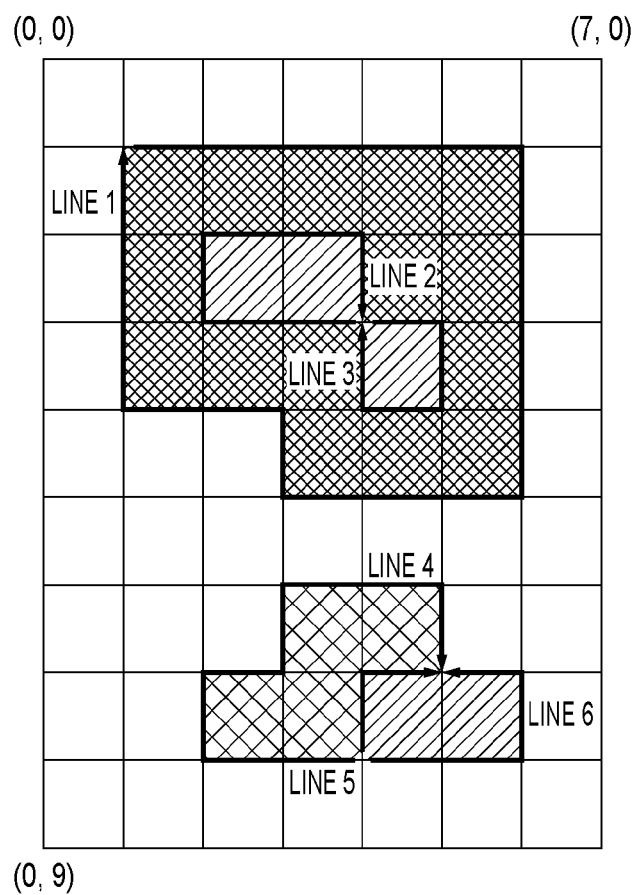
FIG. 10 is a view for explaining extracted boundary lines.

In an example shown in FIG. 10, three lines 4, 5, and 6 are present between coordinate positions (4,8) and (5,7). When these division boundary lines are detected, coordinate position (5,7) may be detected first and coordinate position (4,8) may be detected next, both as intersection points of color regions. At this time, the horizontal coordinate values (lines 4 and 5 in this case) of coordinate positions (4,8) and (5,7) are compared, and the coordinate positions are sorted such that coordinate position (4,8) having a smaller horizontal coordinate value becomes a start point. If the coordinate positions have an equal horizontal coordinate value, a coordinate position having a smaller vertical coordinate value is selected as a start point. Lines 4, 5, and 6 have both the same start point and end point, but have different leftward, upward, and rightward directions, respectively, defined from the start point to the next coordinate position. Therefore, an arbitrary line can be identified in consideration of the three pieces of information: the start point, the end point, and the direction defined from the start point. Also, the coordinate point array of the contour from the start point to the end point is recorded in association with each line. Since, for example, line 5 includes three points, "(4,8), (4,7), (5,7)" is recorded as a coordinate point array on this line.

Also, if a certain coordinate position has a start point and end point that coincide with each other, coordinate position information is recorded clockwise. Both lines 2 and 3 have start points and end points that coincide with each other and are represented by coordinate position (4,3). In this case, a coordinate point array is recorded such that coordinate points are sorted clockwise. Line 2 has the leftward direction defined from the start point to the next point, and line 3 has the rightward direction defined from the start point to the next point, so they can individually, exclusively be identified. In this case as well, a coordinate point array obtained by sorting coordinate values is recorded in association with each line. Since, for example, line 2 includes five points, "(4,3), (2,3), (2,2), (4,2), (4,3)" is recorded as a coordinate point array on this line. FIG. 11 shows a list of boundary line information recorded in association with lines 2, 3, 4, 5, and 6, as mentioned above. These pieces of information are detected and held in a storage unit such as the RAM 5.

With the above-mentioned reference, boundary lines can uniquely be compared as long as the coordinate positions of a start point and end point and the direction defined from the start point to the next point are used to determine whether the currently extracted boundary line has already been extracted. Selection of a point closer to the upper left corner merely gives an example, so other references may be applied as long as the same reference is consistently adopted throughout the processing.

Also, because the extracted boundary lines must be concatenated in subsequent processing, it is necessary to hold region rearrangement information required in concatenation. FIG. 12 illustrates an example of region rearrangement information. When the line numbers of the extracted boundary lines are recorded in a specific sequence, information required to rearrange regions can be obtained. If the currently extracted boundary line has already been extracted, the boundary line number that has already been extracted and recorded is recorded instead. Because information in which the positions of the start point and end point are interchanged is held depending on the boundary line, information indicating to that effect is recorded together in this boundary line when the boundary lines are concatenated in reverse sequence at the time of rearrangement.

Extraction of color regions in the lower part of FIG. 10 will be taken as an example. When boundary lines are extracted based on the contour of region number 3, line 4 can be extracted first and line 5 can be extracted next in reverse sequence. Therefore, "line 4, line 5 (reverse sequence)" is recorded as region rearrangement information of region number 3. Next, when boundary lines are extracted based on the contour of region number 4, line 6 can be extracted first in reverse sequence, and line 5 can be extracted next in normal sequence. Therefore, "line 6 (reverse sequence), line 5" is recorded as region rearrangement information of region number 4.

After processing in step S1003, the CPU 7 checks in step S1004 whether all contour coordinate positions have been processed. If a contour coordinate position to be processed remains (NO in step S1004), the CPU 7 returns the process to step S1001, in which intersection point detection processing is repeated. If all contour coordinate positions have been processed (YES in step S1004), the CPU 7 confirms in step S1005 whether division boundary line recording in step S1003 has been performed. This is done because it is often the case that even a single intersection point of color regions is not detected depending on the regions, and this holds true when the color region to be extracted falls within a color region located outside it. For example, referring to FIG. 10, this holds true for the outside contour of region number 1. In this case, NO is determined in step S1005, and the CPU 7 stores the contour line extracted in step S1006 as a boundary line without division (non-division boundary line recording).

In recording a non-division boundary line as well, the need arises to determine later whether the currently extracted boundary line has already been extracted, so a coordinate point array is desirably sorted. In this case, a point closest to the upper left corner among the contour coordinate positions is determined as a start point, and boundary lines are recorded by consistently defining the clockwise direction as the direction in which the coordinate point array is recorded. A contour corresponding to the outside contour of region number 1 in FIG. 10 includes six points. Among these six coordinate positions, two coordinate positions (1,1) and (1,4) have a minimum horizontal coordinate value. Of these two coordinate positions, coordinate position (1,1) having a minimum vertical coordinate value is selected as a start point for recording, and a coordinate point array is recorded clockwise. As a result, coordinate position (1,1) is recorded as the start point/end point of line 1, the clockwise direction is recorded as the direction defined from the start point for line 1, and "(1,1), (6,1), (6,5), (3,5), (3,4), (1,4), (1,1)" is recorded as a coordinate point array on line 1. Note that coordinate position (1,1) is common to the start point and end point and is therefore redundantly recorded.

Figure 9:
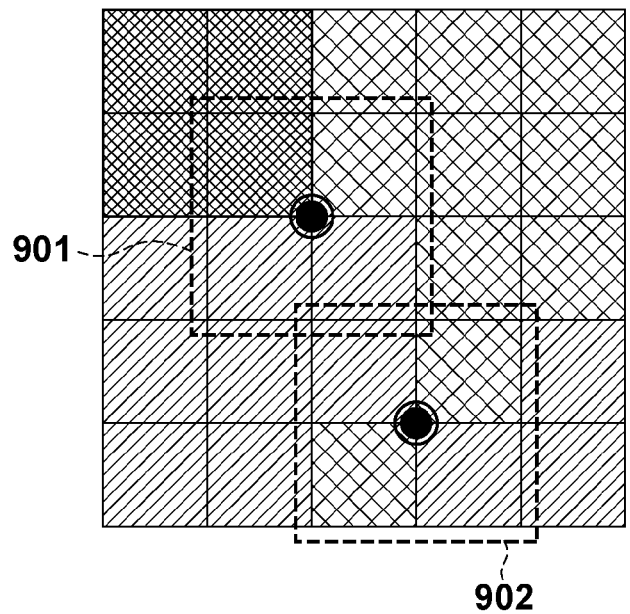
FIG. 9 is a view for explaining the intersection point detection conditions.

FIG. 11 illustrates an example of the structure of information stored in association with boundary lines. If an outside contour and inside contour are present as region rearrangement information at this time, the outside contour is recorded first. As a result, rearrangement information of region number 1 becomes "line 1, line 2, line 3", as shown in FIG. 9. The reference in which a coordinate point array is sorted clockwise upon defining a point closest to the upper left corner as a start point merely gives an example, so other references may be applied as long as the same reference is consistently adopted throughout the processing.

By performing boundary line extraction processing for contour coordinate positions extracted from all color regions, boundary lines can be extracted with neither omission nor inconsistency. The above-mentioned series of processing from step S1001 to step S1006 implements a boundary line extraction unit 25 shown in FIG. 1.

In step S1100, the CPU 7 approximates the contour coordinate position extracted in step S1000 by a given function. In this case, the technique disclosed in Japanese Patent No. 4378208 can be adopted. The contour coordinate position is divided by points which satisfy conditions:

a first angular point: a point at which a vector that connects adjacent point arrays changes at an acute angle, a second angular point: a point of each of the two ends when consecutive points have a distance between them, that is larger than a predetermined threshold, and a point of inflection: a point at which the sign of the exterior product of consecutive vectors changes.

Then, the contour coordinate position is approximated by fitting a Bezier curve to a divided section.

FIG. 13 shows the result of approximating the boundary line shown in FIG. 11 by a straight line and a third-order Bezier curve. The approximation result shows the coordinate position (L) of an endpoint of the straight line or Bezier curve, a control point (C), and a closed curve (Z) as the Bezier curve.

Lastly, in step S1200, the CPU 7 rearranges the curve information of the boundary line approximated in step S1100, and outputs it as vector data. The function approximation result of the boundary line is concatenated with the original contour information in accordance with the region rearrangement information shown in FIG. 12 to generate vector data. Because the shape of the drawn curve remains the same even when the function approximation result is used in reverse sequence, the function approximation result can directly be used in reverse sequence as long as the region rearrangement information specifies concatenation in reverse sequence.

For example, rearrangement information of region number 1 specifies concatenation of all lines 1, 2, and 3 in normal sequence. Therefore, the approximation result of an outside contour corresponding to region number 1 is "L(1,1), L(6,1), L(6,5), C(3,5), C(3,4), L(1,4), Z". Also, the approximation result of an inside contour corresponding to region number 1 is "L(4,3), L(2,3), L(2,2), L(4,2), L(4,3), L(5,3), L(5,4), L(4,4), Z". The above-mentioned processing implements a vector data output unit 26 shown in FIG. 1. In the above-mentioned way, the processing sequence ends.

With the above-mentioned arrangement, even if an input image includes a pattern including an 8-neighbor connection, it is possible to extract a boundary line suitable for vectorization processing, thus improving the image quality of the vectorization result.

<Second Embodiment>

An input image is processed while maintaining its size in the first embodiment, but note that it is sometimes determined that an 8-neighbor connection is not to be modified despite its detection. This is because a modification which uses substitution may deteriorate an image pattern. When, for example, fine lines each having a width of one pixel, as shown in the window 704 of FIG. 7, are neighboring each other, a modification of an 8-neighbor connection cuts the line halfway.

Figure 14:
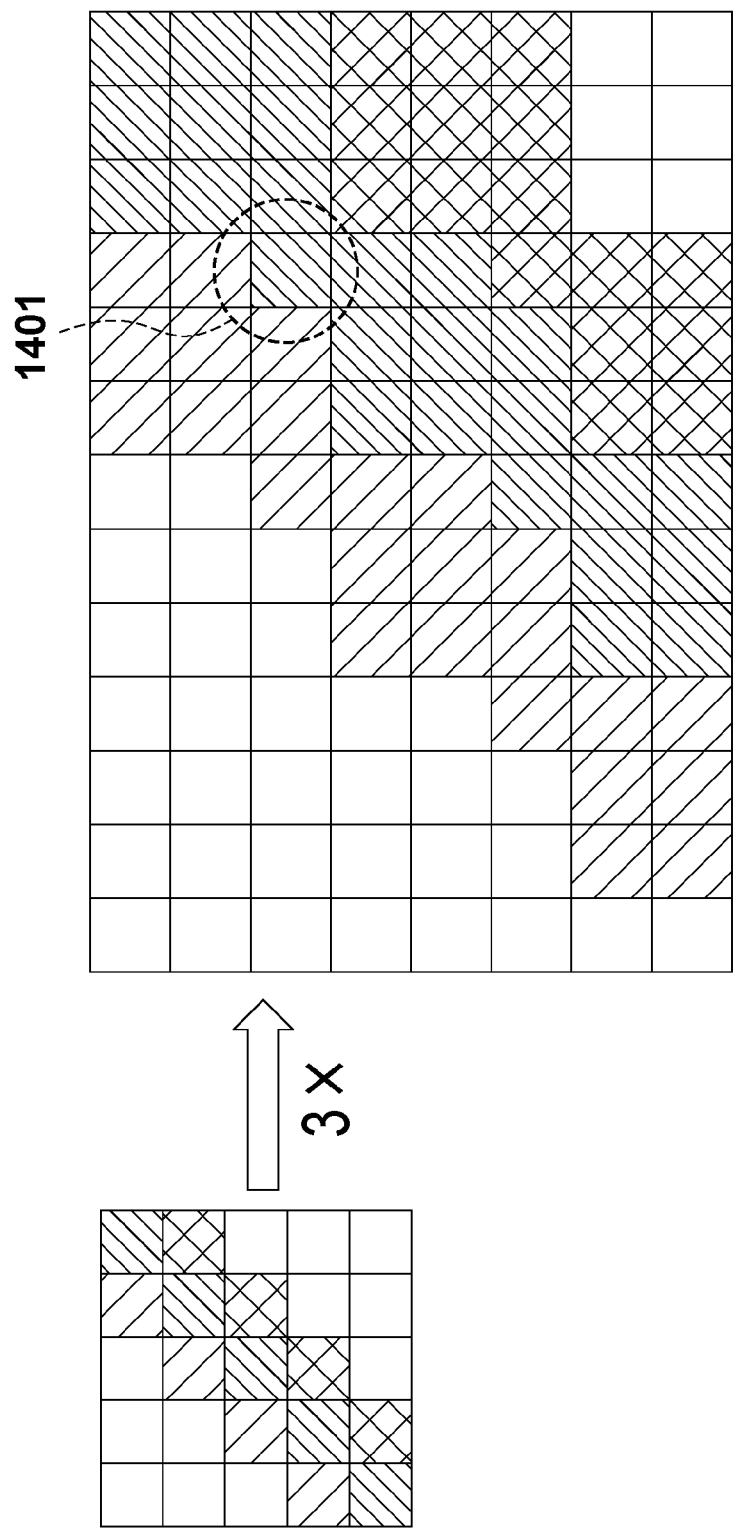
FIG. 14 is a view showing the result of modifying an 8-neighbor connection in an enlarged input image according to the third embodiment.

Hence, in the second embodiment, after an input image is enlarged to a predetermined magnification (its resolution is increased), an 8-neighbor connection is modified to a 4-neighbor connection. FIG. 14 illustrates an example in which an 8-neighbor connection is modified after an input image is enlarged. Referring to FIG. 14, an 8-neighbor connection detection unit 22 processes an image obtained by enlarging each pixel in the input image to magnifications of 3× in the vertical and horizontal directions. A right view of FIG. 14 shows a portion which is enlarged to a magnification of 3× in a left view of FIG. 14 and modified. On the right side of FIG. 14, which shows the enlarged view, four 8-neighbor connections including a pixel 1401 in a portion indicated by a broken line are modified to 4-neighbor connections. In this case, the detected 8-neighbor connections can be modified without deteriorating the existing connection relationship. At this time, an 8-neighbor connection between lines including a non-fine line, shown in the window 705 of FIG. 7, may be determined using a window enlarged to the same magnification as that to which the input image is enlarged. Also, although the enlargement magnification of the image is set to a magnification of 3×, the present invention is not limited to this, and the image may be processed upon being enlarged to a magnification of 2× or 4× or more.

Figure 7:
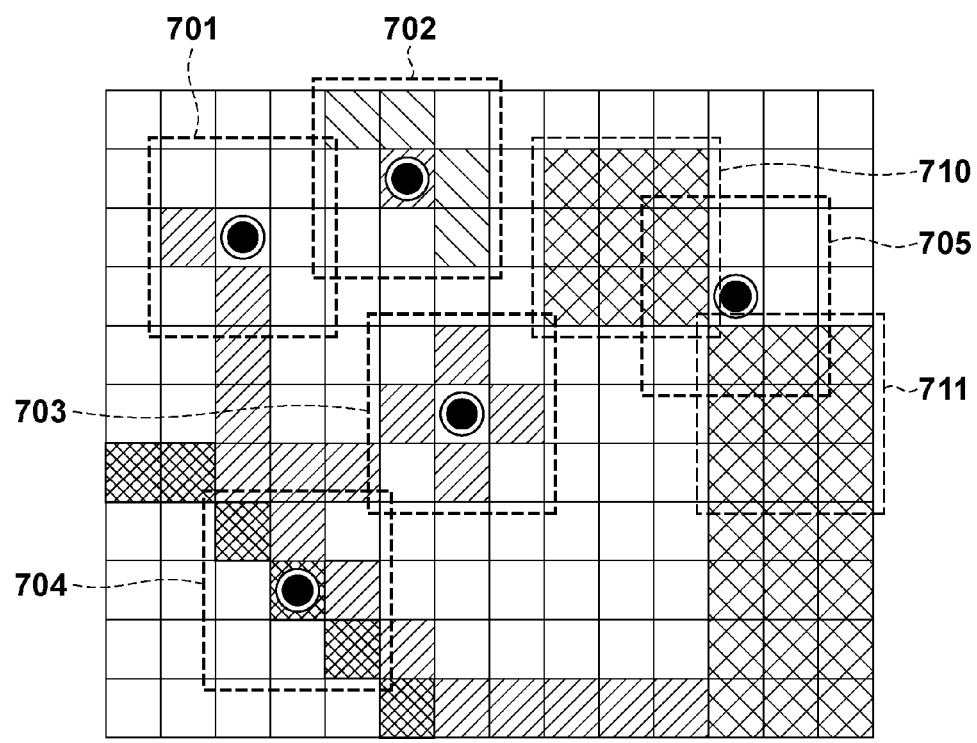
FIG. 7 is a view for explaining the condition in which an 8-neighbor connection is substituted with a 4-neighbor connection.

In the above-mentioned way, in addition to the effect of the first embodiment, it is possible to prevent generation of an output result in which a line is cut halfway upon a modification to an 8-neighbor connection when fine lines each having a width of one pixel are neighboring each other, as shown in, for example, the window 704 of FIG. 7.

<Third Embodiment>

In the first and second embodiments, in step S500, the windows 710 and 711 each having a size of 3×3 pixels are used as confirmation windows to determine whether an 8-neighbor connection between fine lines exists. However, the definition of a fine line naturally changes depending on the purpose of use by the user or the acquisition state of an input image, so a window size of 3×3 pixels is not always optimum.

Hence, in the third embodiment, this window size is changed in accordance with an image input method or fine line detection processing is omitted. When, for example, an image is input from a scanner 1 shown in FIG. 1, reading resolution information of the scanner 1 is acquired together to change the window size. Because the number of pixels in the acquired image increases with an increase in input resolution, it is necessary to increase the window size in order to detect and modify fine lines having the same width. When a fine line which can be detected in a window having a size of 3×3 pixels at a reading resolution of 300 dpi is to be detected upon input at a reading resolution of 600 dpi, the window size must be doubled to 6×6 pixels. In contrast, when the reading resolution is relatively low, a modification from an 8-neighbor connection to a 4-neighbor connection offers little advantage, so this processing can be omitted.

As a method of obtaining a reading resolution from a device other than a scanner, a method which uses the header portion of image data is also available. In a general image format such as JPEG, the reading resolutions in the vertical and horizontal directions can be recorded in the header. Also, if an image is input via a communication I/F 4, resolution information can also be separately received from a transmission source and processed, before image transfer.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-191391, filed Aug. 27, 2010, which is hereby incorporated by reference herein in its entirety.

What is claimed is:

1. An image processing apparatus which performs boundary line extraction for raster image data, comprising:
    a detection unit configured to detect a color region formed from a plurality of pixels connected in an oblique direction of an 8-neighbor connection in the image data;
    a determination unit configured to determine whether the oblique 8-neighbor connection in the color region detected by said detection unit is to be modified to a 4-neighbor connection, in accordance with a connection state of the pixels connected by the oblique 8-neighbor connection and pixels surrounding the pixels connected by the oblique 8-neighbor connection;
    a modification unit configured to modify the oblique 8-neighbor connection in the color region, a modification of which is determined by said determination unit, by converting a pixel value of a pixel neighboring the pixels connected by the oblique 8-neighbor connection; and
    an extraction unit configured to extract a boundary line from image data modified by said modification unit.

2. The apparatus according to claim 1, wherein said extraction unit approximates the extracted boundary line by a given function to generate vector data.

3. The apparatus according to claim 1, wherein said determination unit performs determination for each pixel upon defining a central pixel of a window having a size of 3×3 pixels as a pixel of interest in the image data, and
    determines that a modification is to be performed when a first condition in which no new 4-neighbor connection occurs in substitution for an oblique 8-neighbor connection other than an oblique 8-neighbor connection of interest even when a pixel value of the pixel of interest is modified, and
    a second condition in which no existing connection is cut even when the pixel value of the pixel of interest is modified, are both satisfied.

4. The apparatus according to claim 3, wherein
    said determination unit
    further defines a third condition in which the pixel of interest in the window is not an isolated point, and
    determines that a modification is to be performed when all of the first condition, the second condition, and the third condition are satisfied.

5. The apparatus according to claim 1, wherein said determination unit further determines that the oblique 8-neighbor connection is not to be modified to the 4-neighbor connection when the number of pixels connected to the pixel having the oblique 8-neighbor connection in one of a vertical direction and a horizontal direction is not less than a predetermined threshold.

6. The apparatus according to claim 5, wherein said determination unit changes the threshold of the number of pixels connected to the pixel having the oblique 8-neighbor connection in each of the vertical direction and the horizontal direction, based on a resolution of the image data.

7. The apparatus according to claim 1, further comprising an enlargement unit configured to enlarge the image data to a predetermined magnification,
    wherein said detection unit detects the color region for image data enlarged by said enlargement unit.

8. An image processing method of performing boundary line extraction for raster image data, comprising:
    a detection step of detecting a color region formed from a plurality of pixels connected in an oblique direction of an 8-neighbor connection in the image data;
    a determination step of determining whether the oblique 8-neighbor connection in the color region detected in the detection step is to be modified to a 4-neighbor connection, in accordance with a connection state of the pixels connected by the oblique 8-neighbor connection and pixels surrounding the pixels connected by the oblique 8-neighbor connection;

a modification step of modifying the oblique 8-neighbor connection in the color region, a modification of which is determined in the determination step, by converting a pixel value of a pixel neighboring the pixels connected by the oblique 8-neighbor connection; and an extraction step of extracting a boundary line from image data modified in the modification step.

9. A non-transitory computer-readable medium storing a program to cause a computer to perform the method according to claim 8.

* * * * *